Nov. 25, 1969  R. E. MARTIN  3,480,513

PROCESS FOR THE DESALINIZATION OF BRACKISH WATERS

Filed June 26, 1967  2 Sheets-Sheet 1

Fig.1

Inventor
RALPH E. MARTIN
By Marzall, Johnston, Cook & Root
Attorneys

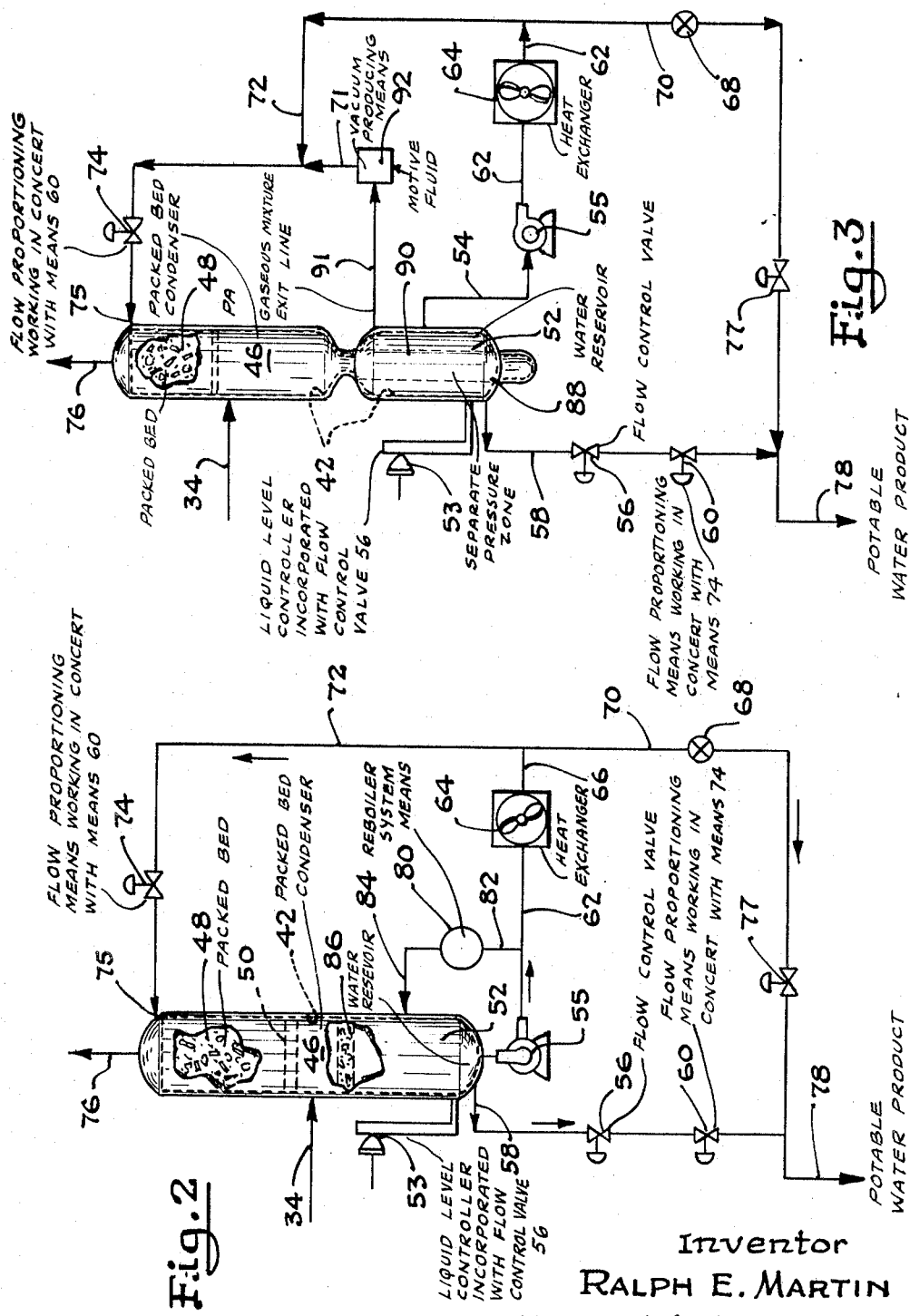

3,480,513
PROCESS FOR THE DESALINIZATION OF BRACKISH WATERS
Ralph E. Martin, Tyler, Tex., assignor to Howe-Baker Engineers, Inc., Tyler, Tex., a corporation of Texas
Filed June 26, 1967, Ser. No. 648,600
Int. Cl. B01d 1/14, 3/00; C02b 1/06
U.S. Cl. 202—185   5 Claims

ABSTRACT OF THE DISCLOSURE

This invention relates to a process for the desalinization of waters which have dissolved therein large quantities of salts. The desalinization is accomplished by passing such waters through a series of treatment zones whereby a high quality low dissolved solids water is produced. The invention contemplates treating a high dissolved solids water in a vaporizing zone to cause the vaporization thereof by direct contact with the combustion gases produced by the burning of hydrocarbons. The vaporized product from the vaporizing zone is then transferred to a condensing zone. The condensing zone is in the form of a vertical packed column. The packed column is divided into at least two sections with the upper section preferably containing a high capacity, low pressure drop packing material. The bottom section of the vertical column is a hot water reservoir. It is critical to the success of the invention that the temperature of the water in the hot water reservoir to be held at a temperature of at least 165° F.

---

In the condensing zone the hot water vapors transmitted thereto from the vaporizing zone are countercurrently treated with droplets of cold water in the packed section of the column by direct contact heat exchange so as to produce by condensation a hot water which is substantially free of dissolved solids.

The hot water contained in the hot water reservoir section of the condensing zone is divided into two streams. The first stream is a finished water which is characterized as being substantially free of dissolved solids. This water may be used as a source of potable water or as a source of water useful in industrial applications where salts and alkalinity are undesirable components.

The second stream withdrawn from the hot water reservoir is subjected to a heat exchange step whereby its temperature is reduced. The thus produced cold water is returned to the upper section of the vertical condensing column for the purpose of producing additional high purity hot water.

An important concept of the invention resides in the volume ratio of the second stream in relation to the first stream withdrawn from the hot water reservoir. For the invention to produce adequate quantities of purified water, it is essential that the volume ratio of the second stream to the first stream be at least 10:1.

The invention is also directed to a method of producing high quality water using the process thus described with an additional adaptation which is directed to the problem of treating a high dissolved solids water which is contaminated with hydrogen sulfide or other volatile sulfur containing gases. These gases contaminate the water due to the treatment of the high dissolved solids water with hot combustion gases which sometimes contain combustion decomposition products such as sulfur dioxide. In some cases the water to be treated contains hydrogen sulfide as a natural contaminant.

To overcome the entrainment of volatile sulfur compounds, the invention further contemplates an additional process step in the condensing zone, which step comprises subjecting the water contained in the hot water reservoir of the condensing zone to external means which cause the water therein to be elevated to above its boiling point, whereby the sulfur contaminants are selectively removed therefrom in the form of a gas. Other dissolved gases, such as oxygen, carbon dioxide, and nitrogen are also removed in this step.

THE INVENTION

As indicated in the abstract of the disclosure, the invention is directed to a process for treating brackish waters, sea waters or brine, to render them substantially free of dissolved solids, thereby producing a finished water which may be either used as drinking water or for use in a variety of industrial processes which require a high quality water. The water produced by the process is characterized as being substantially free of dissolved solids and is surprisingly low in the contaminants, oxygen, carbon dioxide, hydrogen sulfide and $SO_2$.

The process as described utilizes as a heat source for vaporizing high dissolved solids water, hot combustion gases which directly contact the water being vaporized. In a preferred embodiment of the invention the water is heated by direct contact with combustion gases produced by the combustion of hydrocarbons, exemplified by such common fuels at natural gas, propane, diesel fuel oils and residual fuel oils.

While the water may be heated by direct contact with a combustion flame, it is desirable that the flame be contained in an appropriate shield whereby it is insulated from direct contact with the high dissolved solids water.

Based upon the above, it is obvious to those skilled in the art that the invention contemplates using as a heat source for vaporizing the high dissolved solids water a submerged combustion principle. A variety of submerged combustion heaters which apply heat to a liquid by either direct flame contact or by direct contact of the liquid with the hot combustion gases are well known and are commercially available from a number of sources. These devices are easily adaptable whereby they may utilize as a fuel source gaseous or liquid hydrocarbons.

The invention, from an equipment standpoint, is particularly suited to be installed in the form of a small, self-contained, maintenance-free desalinization plant.

In order to prevent the build-up of dissolved solids in the vaporization zone, the invention contemplates the use of continuous blowdown in conjunction with the concept of maintaining within the vaporization zone a constant volume of high dissolved solids water. In a preferred embodiment, the constant volume of high dissolved solids water is maintained by means of a liquid level controller in conjunction with overflow piping which allows excess overflow to be combined with the blowdown output of the zones.

To further provide safety and efficiency a second read-out point in the water level control system is provided, such that the occurrence of an inadequate level of water would actuate signals to a controller so as to reduce fuel input to the submerged burner. As a secondary insurance against the possibility of overheating, a temperature-sensitive reading device is placed in the line connecting the vaporizing zone with the condensng zone. If temperature gets too high in this line, signals from this temperature device will be monitored to a controller in the fuel line. Again, this will actuate the control valve such that input of fuel to the submerged burner will be reduced.

In another preferred embodiment of the invention, mist eliminator means is associated with the vaporization zone to prevent entrainment of high dissolved solids water to the condensing zone.

As also indicated in the abstract of the disclosure, the condensing zone is in the form of a vertically positioned condensing column. This condensing column contains at least two sections, with the upper sections being a vapor liquid containing device. A packed section is the preferred vapor liquid contactor. This section contains appropriate packing to provide a large surface area to maximize heat transfer within this section of the column. The packing may be selected from a large number of available packing materials, but preferably, the materials should provide a high capacity, low pressure, drop finished packing. Typical of such packing materials are slot rings, pall rings and flexi-ring packing. Also capable of utilization in forming the packed section of the column are Raschig rings and Berl saddles.

The lower portion of the condensing zone provides a hot water reservoir which is substantially free of dissolved solids. The temperature of the hot water reservoir is at least 165° F. and is preferably at least between 185° F. and at about the boiling point of the water in the hot water reservoir.

It is important that an adequate temperature differential be maintained between the cooling water at the top of the condensing zone and the water contained in the hot water reservoir in the condensing zone. This temperature differential should be at least 20° and is preferably within the range of 20° to 85°.

The cooling water for utilization in the condensing zone is provided by subjecting a stream from the hot water reservoir to a heat exchange step. The heat exchange step in a preferred embodiment comprises cooling the water from the hot water reservoir with chilled air. While a liquid type heat exchange technique may be used to chill the hot water from the hot water reservoir, it is desirable that a gas liquid exchange be used to minimize scale problems.

In a further specific embodiment of the invention the technique of blending water from the hot product side and from the chilled produce side can be provided for by tapping the chilled product side with a line and running it into the hot product line such that the resulting mixture will be cooler than the hot product, yet warmer than the chilled product. This resulting water taken from the process as described will be sufficiently reduced in temperature to allow its direct and immediate usage as a source of potable water. As an alternative, the hot product water, instead of being directly tapped, can be run through the heat exchanger. The portion in which the two hot and chilled waters are mixed may be monitored by control valves in their respective lines.

The removal of noxious sulfur gases from the hot water reservoir where such gases have been entrained in this water due to the combustion of a sulfur-containing fuel source, is accomplished by the expediency of elevating the temperature of the hot water in the hot water reservoid to above its boiling point where the dissolved sulfur-containing gases, as well as other gases such as $CO_2$ and oxygen, are expelled therefrom, and by suitable means, vented from the condensing zone. The boiling of the water in the hot water reservoir of the condensing zone may be accomplished by several techniques.

Exemplary is the utilization of a vacuum which is drawn from a process line by means of an ejector or as is often called, an eductor. When this method is used, the lowering of the pressure in the reservoir will cause the water to boil at lower temperatures. With the boiling of the water, steam will be generated. The steam acts as a stripping agent. That is, it acts as a carrier in that it will cause the removal of the hydrogen sulfide, the sulfur dioxide, nitrogen and oxygen. These gases will be intermixed in the vapor space of the reservoir. Upon their formation, the ejector will cause their removal. They will be moved through the ejector and then to the chilled water recirculation lines, whereupon the steam coming in contact with the colder water will condense. The remaining gases will stay in the gaseous state as they are non-condensible. The chilled water and the condensed steam are directed to the top of the column where they reenter. At this point, the cooled water, due to gravity, will fall through the bed of the column, and the accompanying gases will be vented out through the top.

An alternative technique to remove the dissolved gases from the product water is the employment of a steam reboil system. In this system, water is taken from the bottom of the product reservoir and recycled through a steam boiler back into the bottom. Steam is generated in the reboiler and introduced in the bottom of the product water reservoir. Steam, through the process of mass transfer, acts as a stripping agent in removing the undesirable, dissolved gases. If such a system is used, an additional section of packing is placed in the de-gassing zone at a point just above the hot-water reservoir to aid in condensation of the up-coming steam.

PRIOR ART

Numerous processes have been proposed for the desalinization of waters high in dissolved solids. Many of these processes, while having the capability of treating high dissolved solids water to reduce the quantity of dissolved salts are not entirely satisfactory either from the standpoints of technology, economics or commercial expediency. Typical of the methods used indesalinization of water are evaporation techniques, freezing, vapor compression and electro-dialysis. When evaporative techniques are used, the high temperature sections of the devices used are rapidly scaled by the minerals contained in the water, thereby drastically reducing the thermal efficiency of such processes. Electro-dialysis which uses ion exchange membranes is incapable of reducing the salt content to a low level without utilizing such large amounts of electrical energy to the point of impracticality. Freezing techniques to exclude salt are expensive due to the excessive cost in removing heat from large volumes of brines being acted upon by the processes.

The present invention is directed to an efficient process of the type that produces a finished water at a low economical cost. It is capable of design modification to allow it to be constructed at one site and transposed to various areas where it is to be used. The invention utilizes as a heat source any number of hydrocarbon fuels and is particularly efficient and economical when used on the job sites of petroleum drilling and production operations. In such areas hydrocarbon fuel is in plentiful supply and is often needlessly wasted as evidenced by the many waste burners that are commonly used in petroleum production areas to dispose of waste gases.

By having the capability of utilizing a variety of fuels and in the case of smaller units being relatively mobile, the invention leads itself to being extremely versatile.

As will be shown hereinafter, the invention in its physical embodiments features designs which make it relatively maintenance free. One such facet is that evaporation and condensation are by direct contact, heat exchange and consequently scaling and corrosion of heat exchange surface is eliminated. Because of working temperature ranges to which the system will be applied are low, extensive use of thermally stable plastics and metal equipment coated with such plastics may be used to allow for a variety of design adaptations to be employed. Both the evaporator and the condensing column may be plastic lined to eliminate corrosion. Column packing and the mist eliminator may also be plastic. Plastic pipe may be used for all corrosive water service with fiber glass-reinforced pipe being used in most cases.

OBJECTS OF THE INVENTION

Based on the above, it is evident that the invention provides a long-felt need in the art of treating waters containing relatively large amounts of dissolved solids. It is capable of design adaptation and fills a long-felt need in the art.

It, therefore, is an object of the invention to provide an improved process for the desalinization of water high in dissolved solids.

Another object of the invention is to provide a desalinization process based on thermal principles which utilize as a heat source submerged combustion gases.

A further object of the invention is to provide a desalinization process which is relatively maintenance free and which is capable of producing a water suitable for potable and industrial uses.

A specific object of the invention is to provide a water treating process capable of removing dissolved gases such as hydrogen sulfide.

A still further object of the invention is to provide a unitary process of purifying water in the form of several zones which are interrelated and dependent, one upon the other, whereby a process equilibrium condition is rapidly established and maintained.

Other objects will appear hereinafter.

THE DRAWINGS

While the invention has been specifically described from a process standpoint, it may be more readily understood with reference to the drawings which are in a schematic, broken away in part, view of a typical embodiment of the invention, simplified in nature to more readily understand the process. The drawings show the vaporization zone using a submerged combustion heater and the condensation zone as a vertical positioned, partially packed condensing column.

FIG. 1 represents the process system which is to be used for water which does not contain dissolved gases.

FIG. 2 illustrates a reboiler system where such modifications would be desired in the event that the system would be used to desalinize water which is concentrated with undesirable corrosive gases.

FIG. 3 shows the use of a vacuum boil system for removing undesirable gases. In the drawings, like parts have like numbers.

With specific reference to the drawings, there is shown in FIG. 1 a vaporizer 14 which is in the form of a vertical reaction vessel. The vaporizer is fitted at its top with a submerged combustion device 30 which is connected by means of suitable lines 28 and 32 to an air supply such as blower 22 and a fuel source (not shown) respectively. Fuel line 16 and air line 28 are each fitted with safety pressure switches 20 and 26, respectively.

Near the top of the vaporizer 14 is fitted an inlet line 10 which supplies to the vaporizer the high dissolved solids water to be treated. Water supply line 10 may be fitted with a flow control regulating valve 12. This valve helps maintain within the vaporizer 14 a constant volume of high dissolved solids water. The vaporizer 14 is fitted with a liquid level controller 40, in which is incorporated a blowdown valve 38 which is positioned at the bottom of the vaporizer 14. By regulating liquid level controller 40 and flow control regulator 12 in conjunction with the proper setting of blowdown valve 38, which allows for emission of water through line 36, it is possible to carefully maintain a constant volume of high dissolved solids water in the vaporizer 14 without substantially increasing the salt content to the point where excessive scale build-up occurs.

In air line 28 there is flow control valve 24 which may be varied as a function of fuel input so as to control air input to the system.

Also, as an added safety device, a flow control valve 18, in fuel feed line 16, is incorporated into liquid level controller 40 so that if the level of the water in evaporator 14 reaches an inadequate level, signals from known electrical sensing devices and wiring not shown will be conveyed to the control valve 18 in the fuel line system, causing a reduction in fuel input to the system. Similar provision may be made in transmission line 34 so that control valve 18 may be actuated so as to decrease fuel input if temperature gets too high in this line. The reason for this is obvious. If the liquid level were to drop to a low or inadequate point and the input of the fuel to the submerged burner 30 would remain the same as that for a full system, there would be an overabundant supply of heat generated. This excess heat would be dangerous.

To further improve the operational efficiency of the vaporizer 14, it is desirable that its inner walls and bottom be lined with a thermally stable, smooth surfaced, heat-resistant plastic 42. This coating may be prepared from a variety of synthetic materials such as Teflon (polytetrafluoroethylene), high density polypropylene or fiber glass-reinforced polyester or epoxy resins. These surfaces prevent the accumulation of difficultly removable scale while, at the same time, providing a substantially corrosion resistant vaporizer.

The submerged combustion device 30 is preferably of the flame enclosed type which allows only the hot combustion gases to directly contact the aqueous liquid in the vaporizer 14. Since the water temperature in the vaporizer is only under a slight pressure, the temperature of the water rarely is in excess of 200° F. At this temperature the plastic coated walls 42 are immune to heat deformation, thereby rendering them capable of providing a long life, maintenance free vessel.

As the water in vaporizer 14 is elevated to about its boiling point, there is produced a gaseous mixture which comprises combustion gases which are saturated with water vapors. These vapors are transferred from vaporizer 14 through vapor transmission line 34 into a condensing column 46. To minimize water droplets from being carried with the water-saturated gas vapors, a mist eliminator of known design 44 may be placed in vapor transmission line 34 at a point just above the vaporizer 14.

The gases containing the water vapors pass upwardly through the column 46 into packing 48, which is supported by a horizontally mounted perforated tray 50. The packing is lower in temperature than the temperature of the water entrained in the combustion gases. As a result of contacting the cooled packing 48, the water vapors are condensed and pass downwardly to form a hot water reservoir section 52 located at the bottom of column 46. The combustion gases pass upwardly through column 46 and are vented to the atmosphere through vent line 76. To provide chilled water, a portion of the hot water in the hot water reservoir is withdrawn therefrom through line 54 and, by means of pump 55 and line 62, is transmitted to a heat exchanger 64 which is shown schematically in the drawing as being a fin-fan heat exchanger.

The water, having been reduced in temperature by cooling heat exchanger 64, is then transmitted through line 72 where it is returned continuously to point 75 in the column 46 above the packing 48. To balance the system, line 72 is provided with a flow control regulating valve 74.

The bottom of column 46, and the section thereof comprising the hot water reservoir 52, is further fitted with a liquid level controller 53 having incorporated therein control valve 56. Said liquid level controller may be of conventional design.

Product line 58 removes a portion of the hot water from the hot water reservoir 52 to line 78, where it is further removed to a finished water holding tank (not shown).

It should be noted that proportioning valve 60 is employed to define the ratio of flow rate of exiting hot product water as compared with exiting chilled water from heat exchnager 64.

When it is desired to chill finished product water as to render it immediately potable, chilled water exiting from the heat exchanger 64 into line 66 may be bypassed to combine with the hot water product through line 70 by opening valve 68. In line 70 is control valve 77 which can be used to regulate the flow, if different degrees of temperature are required in the final mixture of water.

In FIG. 2, when the water in hot water reservoir 52 is contaminated with volatile sulfur compounds such as hydrogen sulfide or sulfur dioxide, there is provided heating means for the hot water, such as reboiler 80 which picks up water from line 62 by line 82, whereby it is converted to steam which is passed through line 84 into the hot water reservoir 52. The steam, acting as a stripping agent, removes therefrom the gaseous sulfur compounds as well as any traces of $CO_2$ and oxygen. These gases pass upwardly through column 46 and are discharged to the atmosphere through vent 76. To prevent expulsion of water from the hot water reservoir there may be provided within column 46 a second packed section 86. This section, which is chilled by water passing downwardly through column 46 by direct heat transfer, tends to trap water droplets which are returned by gravity to hot water reservoir 52.

Alternatively, these undesirable dissolved gases may be removed by the modified design shown in FIG. 3. Here, the hot product water produced by condensation in 46 is delivered from 46 to the bottom 88 of vacuum chamber 90. Vacuum is applied in the chamber via line 91 by an ejector 92. The application of this vacuum causes water to boil at lower temperatures. As a consequence of the boiling, steam is formed. The steam strips the gases and this mixture of steam and undesirable gases is removed from the system by the ejector 92. This mixture of gases is removed through line 91, passes through the ejector into line 71 and then is contacted with chilled water in line 72. By coming in contact with this chilled water, the steam condenses. The resulting noncondensable gases stay in their gaseous state.

An important concept of the invention resides in the maintenance of the temperature differential between the hot water in the hot water reservoir 52 and the inlet water temperature entering through inlet 75 by at least 20° and preferably about 80–85° F.

It is also an important concept of the invention that the volume of water leaving line 54 be at least 10 times greater than the volume of water passing through line 58, preferably it is 20 times greater and most preferably it is not more than 40 times greater.

The major units shown in the drawing such as line 34 in column 46 are plastic or plastic lined, as is vaporizer 14. In a preferred embodiment of the invention all of the piping is also plastic or plastic lined.

The packing 48 and 86 in column 46 should be of such a nature so as to provide high capacity and low pressure drop. As indicated, the packing should be preferably slot rings, pall rings and flexi-ring packing types. Also capable of utilization in forming the packed section of the column are Raschig rings and Berl saddles.

As previously indicated, the relationship between the volume of water passing through line 54 in relation to the volume of water passing through line 58 must be maintained at a ratio of 10:1. This ratio may be increased to as high as 20:1 with the upper limit being at about 40:1. These volume relationships may be controlled in several ways. For instance, pump 55 may be of a variable output type whereby the volume of water delivered through line 62 can be controlled. Similarly, flow control regulator 74 may be preset in relation to the output of line 58 to control the specific ratio. Alternatively, the ratio may be controlled to a limited extent by selecting a proper line size for line 58. A temperature controller may be used to control the flow by maintaining a preset temperature such as 185° F. in the hot water reservoir.

The criticality of the water temperature of the water entering the condensing column at point 75 is illustrated by the fact that when this temperature is 160° F., 25% of the water vapors in the combustion gases are lost through vent 76.

Usually the equilibrium temperature is approximately the average temperature of the two temperature differentials and is attained at a point at about the bottom of packing 48.

It should be noted that the use of packing 48 for condensing the water by way of direct heat transfer is an important feature contributing to the successes of the invention. This packing provides a maximum heat transfer surface far superior to other cooling type heat exchange devices. Since the vapors contacting the packing are carried by hot combustion gases conventional heat exchange surfaces give very low heat transfer rates due to the noncondensables present. If a conventional heat exchanger was used to condense the water, the product water would be saturated with combustion gases at the lowest temperature reached and would be corrosive.

CONCLUSION

The thus described processing apparatuses are capable of furnishing a high quality, dissolved-solids-free water. The invention is capable of being designed from an equipment standpoint to treat large or small quantities of water, depending upon the water requirements sought to be fulfilled. In cases where only small volumes of water are to be purified by the practices of the invention, it is possible to prefabricate much of the equipment shown in the drawings at one site and to then transport it to the situs where it is to be used. The versatility of the process is characterized by its ability to utilize as a fuel source a large variety of hydrocarbons and to readily purify many different types of high dissolved solids waters.

The process is capable of purifying waters which contain large amounts of dissolved salts. Such waters have been generically termed herein as being, "waters which are high in dissolved solids." This especially is meant to categorize aqueous fluids which have dissolved herein at least 1000 p.p.m. of salts, acids, bases and organic compounds of all types. The invention is particularly adapted to purifying what are generically categorized brine waters whose dissolved solids content may be far in excess of the dissolved solids of sea water which contains about 35,000 p.p.m. of dissolved salts.

An important contribution of the invention resides in the maintenance of constant volume, high-dissolved-solids water in the vaporizer 10 which tends to minimize the build-up of scale in this vessel, thereby eliminating to a great degree a troublesome problem encountered in evaporative type schemes which have been proposed for the desalinization of water.

Having thus described my invention, I claim:
1. An apparatus for the desalinization of water high in dissolved solids and dissolved gases, comprising:
   (A) a vessel adapted to hold a body of high dissolved solids water and a submerged combustion burner associated therewith adapted to vaporize the high dissolved solids water and subsequently form a gaseous mixture comprising water vapors and combustion gases, said vessel having a liquid level controller incorporated with a blow-down valve and a flow control regulator such that the flow control regulator will discharge water when the water level within the submerged combustion burner exceeds a defined height;
   (B) air and fuel feed lines for supplying a combustible mixture to the submerged combustion burner and a water feed line adapted to feed water high in dissolved solids to the vessel, said combustible mixture being produced by flow proportioning means comprising two flow control valves working in concert, where said valves are fitted in said fuel and air feed lines and furthermore where said water feed line is fitted with a flow control regulating valve;
   (C) a gaseous mixture feed line for feeding the produced gaseous mixture to a vertically disposed packed bed condenser, said feed line being fitted with a mist eliminator in order to minimize produced water droplets from being carried with the gaseous mixture;
   (D) said vertically disposed packed bed condenser hav- ing a top and a bottom and further characterized as having a water reservoir with a reboiler system means associated therewith at its bottom where a hot water condensate product is collected, and removed to a heater for continuous reboiling so as to produce a reboiled water which is free of any water soluble gases which may have redissolved in the water condensate, and return to the reservoir said bottom being fitted with first and second liquid withdrawal lines where the first line is adapted to remove a fraction of the collected reboiled water condensate as a potable water product and the second line being adapted to remove a proportionate fraction of the same water product as a hot water reboil recycle stream, said water reservoir being fitted with a liquid level controller which is incorporated with a flow regulating valve positioned in the first withdrawal line and where said first and second withdrawal lines also contain flow proportioning means which work in concert with one another such that a desired flow proportion ratio may be obtained; and (E) a heat exchange means in circuit with the second withdrawal line up stream from the heater to cool a portion of the water in the second withdrawal line said heat exchanger being further fitted with a line to carry the cooled recycle water to the top of the vertically disposed condenser wherein it is fed into the packed bed condenser where it serves to condense the rising water vapors.

2. The apparatus of claim 1 where the packed section in (E) comprises an upper section and an intermediate section.

3. The apparatus of claim 2 where the packed section in (E) of the vertical condensing column is a high capacity, low pressure drop packing.

4. The apparatus of claim 1 where the reboiler in (D) is a vacuum boil system comprising a separate pressure zone evacuated by a vacuum producing means to which the condensate is fed and boiled.

5. The apparatus of claim 4 where the vacuum producing means is an ejector.

References Cited

UNITED STATES PATENTS 2,598,116   5/1952   Du Bois _____ 55—73
2,770,295   11/1956   Allen.
3,214,348   10/1965   Lichtenstein _____ 261—112

NORMAN YUDKOFF, Primary Examiner

J. SOFER, Assistant Examiner

U.S. Cl. X.R.

159—16, 44; 202—202, 234; 203—49, 100